United States Patent
Frost

[11] 3,918,325
[45] Nov. 11, 1975

[54] EXTENDED RANGE DUAL-PATH TRANSMISSION

[75] Inventor: Barry L. Frost, Jackson, Mich.

[73] Assignee: Clark Equipment Company, Buchanan, Mich.

[22] Filed: Jan. 21, 1974

[21] Appl. No.: 435,401

[52] U.S. Cl. ................................................ 74/687
[51] Int. Cl.² ......................................... F16H 47/04
[58] Field of Search ............ 74/793, 687, 674, 705, 74/720.5

[56] References Cited
UNITED STATES PATENTS

| | | | |
|---|---|---|---|
| 3,534,635 | 10/1970 | Polak | 74/720.5 |
| 3,709,060 | 1/1973 | Orshansky, Jr. | 74/687 |
| 3,709,061 | 1/1973 | Orshansky, Jr. | 74/687 |
| 3,783,711 | 1/1974 | Orshansky, Jr. | 74/687 |
| R27,307 | 3/1972 | DeLalio | 74/687 |

*Primary Examiner*—Benjamin W. Wyche
*Assistant Examiner*—Frank H. McKenzie, Jr.
*Attorney, Agent, or Firm*—Ernst H. Ruf

[57] ABSTRACT

A dual-path infinitely variable speed dual range power transmission having an extended total constant horsepower output range including an input means drivingly interconnected with a final output means. A combination planetary gear train means is drivingly connected to the input means and includes intermeshing first and second sets of planet gears, with a common carrier serving as the output means of the planetary gear train means. The first and second sets of planet gears are intermeshed with first and second ring gears, respectively, and a reaction gear is in mesh with one of the first and second sets of planet gears, and at least a portion of the gear train means serves as one of the dual-paths in each of the transmission ranges. First and second input gears are driven by the input means and are drivingly interconnected with the first and second ring gears, respectively, while the final output means is connected with the common carrier. There are means for alternately connecting the first and second input gears to the first and second ring gears, respectively, and means are provided for connecting the reaction gear to the input means through a variable speed device, with this device comprising another of the dual-paths in each of the ranges, and providing a speed proportional to the speed of the input means on one, and a variable speed on the other, of the input means and the reaction gear, respectively, for regulating the horsepower applied to the planet gears. Formula I permits the solution for the smallest possible variable speed device that is capable of transmitting the maximum horsepower regenerated within a two-range, dual-path transmission. By satisfying another formula, II, the transmission achieves the largest possible total constant output horsepower range of any known two-range, dual-path transmission. In addition, the size of all planetary elements is optimized so that, for the total desired constant output horsepower range, the level of maximum torque that is generated in each of the two ranges is substantially the same. Furthermore, the transmission of this invention is regenerative in one of its speed ranges at substantially zero output speed.

29 Claims, 4 Drawing Figures

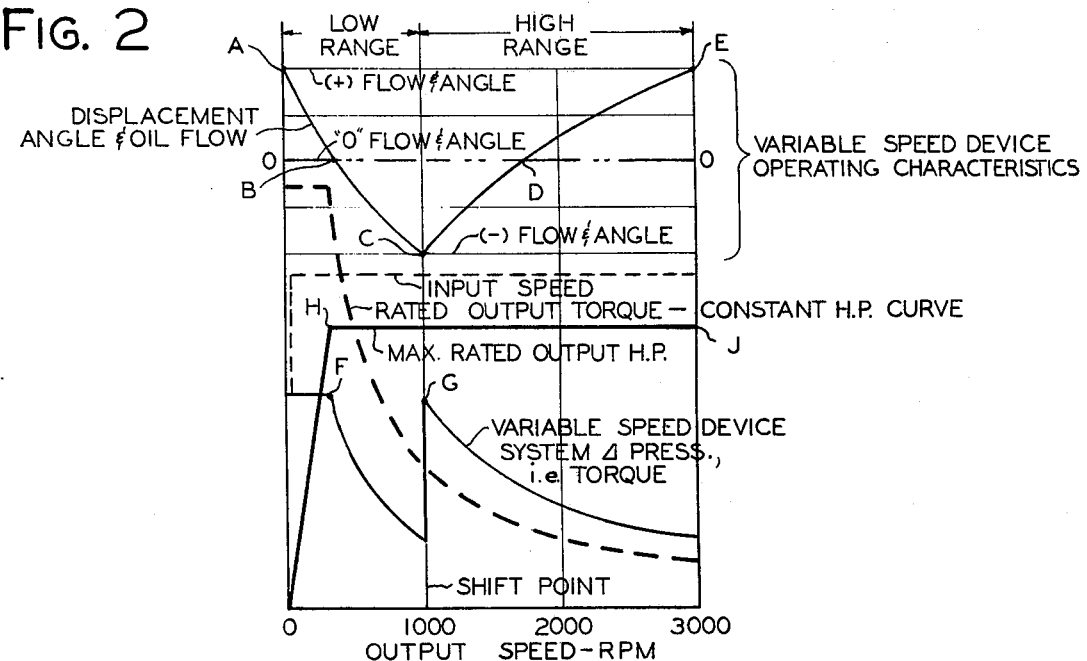
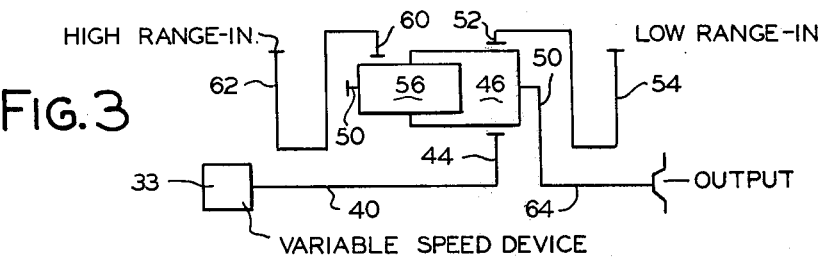
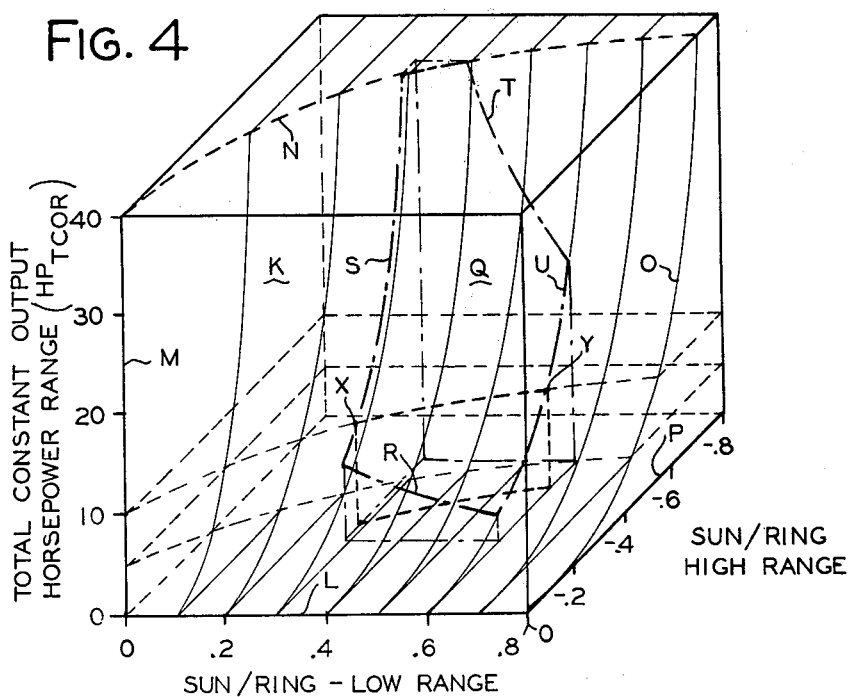

EXTENDED RANGE DUAL-PATH TRANSMISSION

BACKGROUND OF THE INVENTION

1. Field of the Invention

The field of art to which this invention pertains includes that of machine elements and mechanisms; more specifically, variable speed dual-path transmissions having two infinitely variable speed ranges and an extended total constant horsepower output range, wherein one transmission path includes a variable speed device.

2. Description of the Prior art a purpose of this invention is to provide a commercially producible infinitely variable speed transmission, more specifically, a variable speed dual-path transmission having two infinitely variable speed ranges and an extended total constant horsepower output range. Infinitely variable transmissions of the pure hydrostatic type are limited to applications where significant power losses can be tolerated in return for the benefits of improved transmission ratio control. Hydromechanical transmissions offer the control benefits of a hydrostatic transmission, but by virtue of the fact that only portions of the prime mover power are transmitted by the hydraulic units, hydromechanical transmissions remove the performance barrier of excessive power losses. The extent to which any hydromechanical transmission can accomplish this purpose is strictly a function of that percentage of the power which must be transmitted hydraulically.

The instant invention provides for minimum hydraulic power transmission while at the same time avoiding the pitfalls of excessive complexity, speeds or loads in the gear trains. One significant benefit of this invention is that it reduces the corner horsepower of the hydraulic units to substantially the smallest possible amount. Corner horsepower may be defined as the maximum horsepower that the hydraulic unit would be capable of transmitting if it ran at a combination of its maximum torque and at its maximum speed. These conditions determine the size of the hydraulic units, and by minimizing the corner horsepower, the sizes and weights of the hydraulic units are correspondingly minimized.

As noted, the transmission of this invention has infinite speed variation from zero output to maximum output, but it has an extended total constant horsepower output range capability, meaning, that the ratio of the maximum torque that it develops at full horsepower to the minimum torque that it develops at full horsepower is very large — e.g., extending from about 2:1 ratio to up and beyond 40:1.

The transmission of this invention preferably takes the form of a dual-range hydromechanical transmission, i.e., having a mechanical power path and a hydraulic power path in each of its two speed ranges. The mechanical power path of this invention utilizes a combination in which two sets of planet gears are mounted on the same carrier and in mesh with each other. In addition, each set of planet gears meshes with a separate input member, typically, two separate ring gears, with one of the sets of planet gears being in mesh with a sun or reaction gear. The common carrier comprises the output member for both planetary gear sets and is drivingly connected with an output shaft. A similar planetary gear arrangement is set forth in FIGS. 10 and 11 of U.S. Pat. No. 27,307 to DeLalio. This prior art output planetary gearing is used in combination with a hydraulic pump-motor circuit wherein selectively operable clutch and brake means are provided for controlling the connection to the output planetary gearing, with the two hydraulic elements of the hydraulic transmission portion being permanently drivingly interconnected with the portion of the input means and a portion of the output planetary gearing, respectively. While this prior art structure appears at first glance to be very similar to that of the present invention, in the prior art transmission, in its first stage or range of operation, the hydraulic pump and motor function as a simple circuit with the motor driving the output means through the output planetary gearing reduction ratio. Thus, in the first, or low, range, this prior art transmission is not hydromechanical, i.e., it does not have a dual-path power flow but only a single hydraulic or hydrostatic path. In contrast thereto, the transmission of this invention utilizes a dual-path power flow in each of its two ranges.

It may appear to be obvious that the low range brake, that is used on one of the ring gears in the planetary combination of the prior art transmission, could be replaced with a clutch that drivingly connects the same ring gear to the input means as in the present invention. However, this has been accomplished successfully only in the present invention and not-so-readily-apparent reasons therefor, are as follows:

A review of the graphs illustrating certain operating characteristics of the noted prior art transmission (FIGS. 12 to 14 of U.S. Pat. No. 27,307) shows that the high range output speed ratio operates between 0.44 (the synchronous shift point) and 1.2 while low range operates from reverse 0.44 to forward 0.44 (the shift point). If one were to use a clutch in place of the brake to control the low range internal ring gear of FIG. 10, then three conditions would occur which would make a modified version useless to those skilled in the art. These conditions are: 1. The lowest ratio obtainable, since the low range ring gear must be slightly larger than the high range ring gear, would be about 0.1 in the forward direction and not only will the output be incapable of regeneration at zero output speed but also the output would not have reverse capability. 2. The 0.44 synchronous shift point of the prior art transmission cannot be attained when the low range has to be capable of regeneration at zero output speed. 3. The hydraulics would be severely unbalanced by the requirements for larger hydraulic units in one range over the other, which imbalance would cause loss of control should the smaller hydraulic units be overloaded. It should now become obvious that this modified system is unbalanced and substantially useless since all control of the transmission ratio will be lost if high pressure oil in high range is dumping over into the transmission sump, i.e., performance is severely limited due to the maximum pressure limit of the hydraulics. Therefore, the most significant advance of the transmission of this invention is its improved capability of optimizing, balancing and extending the design by using a low range clutch and regenerating at zero output speed.

The transmission of this invention differs over the noted prior art transmission in a number of ways. First of all, the transmission of this invention has a dual-path power flow in each of its two ranges in contrast to the prior art single path hydrostatic low range. Second, the present transmission is regenerative at zero output, i.e., in low range the transmission has zero output capability while the input and the reaction elements are rotating. Thus, the output speed will always be zero if the variable speed device is providing an opposite rotation to the sun gear at its maximum speed. This feature cannot be obtained in the prior art device and is not so obvious an improvement, yet, a significantly smaller variable speed device can be utilized in the present transmission when comparing equivalent output performance characteristics of the present and prior art transmissions. Thirdly, the variable speed device in the present transmission is utilized to its maximum design capability in both transmission ranges; even at zero output of the transmission, the variable speed device is operating at approximately its maximum speed. Fourthly, and again in contrast with the prior art device, the maximum torque capability of the transmission of this invention is substantially the same in each of its ranges. What this means is that the physical size of the planetary elements of each of the planetary assemblies is optimized so that, for the desired total constant horsepower output range, the level of maximum pressure and torque that is applied to the variable speed device, in each of the two speed ranges, is substantially the same. Again, this feature is not taught by the prior art. Furthermore, the physical sizes of the planetary elements in each of the planetary assemblies are optimized so that, for the desired total constant horsepower output range, the variable speed of the variable speed device is substantially the same at zero output speed, at overlapping range ends and at maximum output speed of the transmission.

SUMMARY OF THE INVENTION

The power transmission of this invention takes the form of a variable speed dual-path transmission having two infinitely variable speed ranges and an extended total constant horsepower output range. This transmission preferably takes the form of a dual range hydromechanical transmission, i.e., having both a mechanical power path and a hydraulic power path in each of its two ranges. The transmission includes input means, output means and a pair of gear trains for alternately connecting the input means to the output means and for providing transmission ranges of different ratios. Each gear train includes a planetary gear assembly, with a set of planet gears of a first planetary gear assembly, of one gear train, being intermeshed with a set of planet gears of a second planetary gear assembly of another gear train. Both sets of planet gears utilize a common carrier, with the common carrier comprising the output member of the pair of gear trains and being drivingly connected with the output means. The input means is drivingly connected to both sets of planet gears through first and second ring gears, respectively. A sun gear is in mesh with one set of the planet gears and serves as the reaction member, with a reaction shaft being connected to, and in driving relation with, the sun gear. While the gear trains comprise one of the dual-paths, each range of the transmission includes a means for connecting the reaction shaft to the input means through a variable speed device, with the variable speed device comprising another of the dual-paths in each of the transmission ranges. the variable speed device provides a speed that is proportional to the speed of the input means on one and a variable speed on the other of the input means and the reaction shaft respectively, with the maximum horsepower that the variable speed device must be capable of transmitting substantially fitting the equation I:

$$\text{Max. Variable Speed Device H.P.} = \text{Input H.P.} \times \left[ \frac{1}{4} \left( \sqrt{(4 \times \text{Max. Total Constant H.P. Output Range} + 1)} - 1 \right) \right] \quad (1)$$

The end of the range of one gear train overlaps the beginning of the range of the other gear train, and the gear trains are alternately connected and disconnected to the input means at the overlapping range ends. Thus, power is transmitted alternately from each of the gear trains to drive the output means through its two speed ranges, with one of the speed ranges being regenerative at zero output speed.

The variable speed device preferably takes the form of a pair of separate hydraulic units, one serving as a motor-pump while the other serves as a pump-motor, and vice versa.

The physical size of the planetary elements of each of the planetary assemblies is optimized so that for the desired total constant horsepower output range, the level of maximum pressure and torque that is applied to the variable speed device in each of the two speed ranges is substantially equal.

The physical size of the planetary elements of each of the planetary assemblies is also optimized so that, for the desired total constant horsepower output range, the variable speed of the variable speed device is substantially the same at zero output speed, at overlapping range ends and at maximum output speed of the transmission.

The total constant horsepower output ranges of this transmission preferably extend from about 2:1 up to and beyond 40:1. In addition, the sun/ring gear ratios of each of the planetary assemblies of the structure shown in FIGS. 1 and 3 preferably lie in the range from about 0.27 to about 0.60.

The detailed description also includes a formula (II) for calculating the total constant horsepower output range when the values for the input horsepower and the variable speed device horsepower are known. Furthermore, the description includes a listing of values and factors that must be known and/or derived in order to develop a truly optimized and workable system.

Other objects, features and advantages of the invention will become more readily understood by persons skilled in the art when following the detailed description in conjunction with the several drawings.

BRIEF DESCRIPTION OF THE DRAWINGS

FIG. 2 is a graph illustrating certain operational characteristics of the transmission shown in FIG. 1.

FIG. 3 is a schematic representation showing the interaction between the two planetary assemblies and the variable speed device also shown in FIG. 1.

FIG. 4 is a three dimensional graph that may be utilized to determine a balanced design for the transmission of this invention.

DESCRIPTION OF A PREFERRED EMBODIMENT

Figure 1:
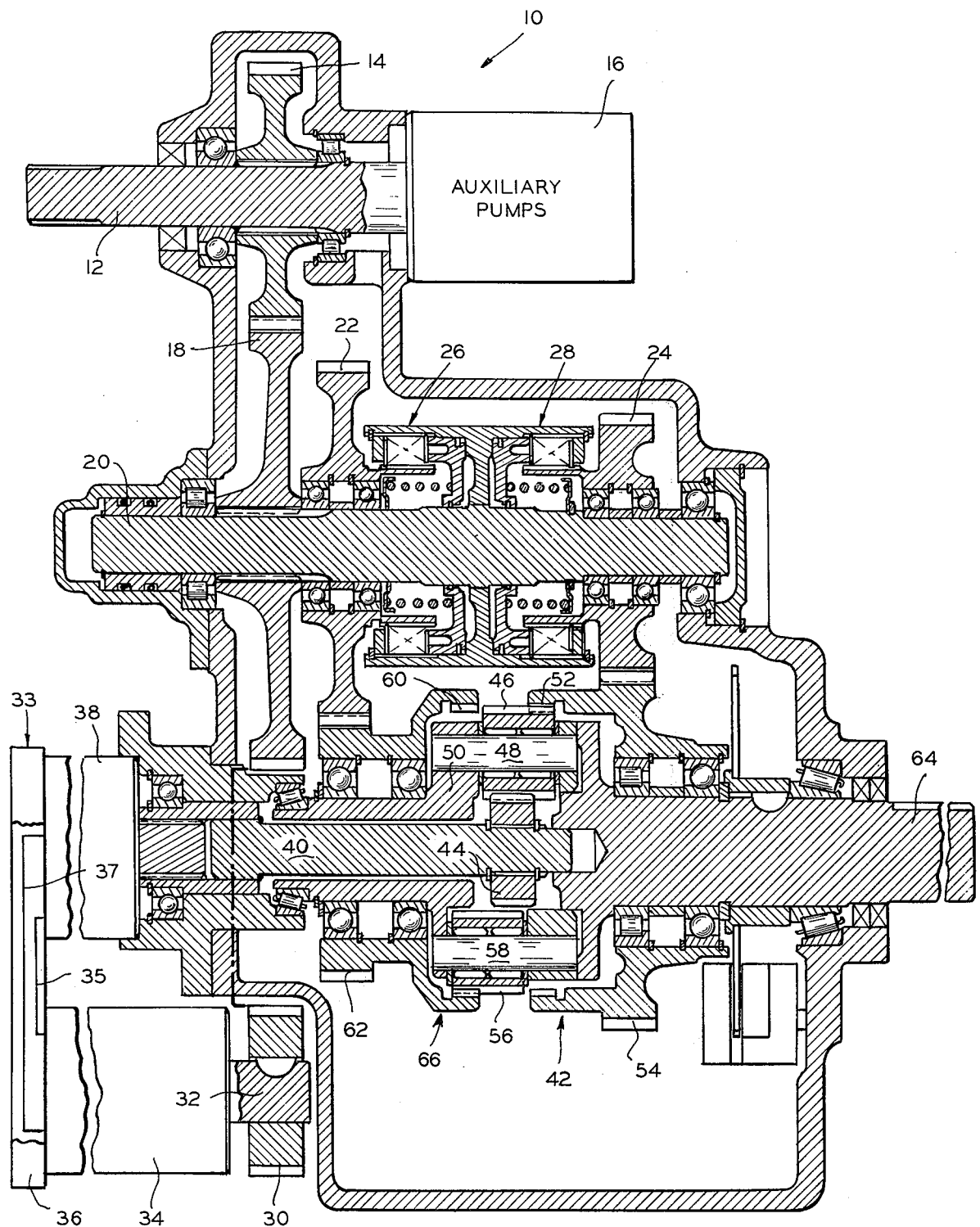
FIG. 1 is a partially schematic or diagrammatic view, in elevation and in section, of an extended range dual-path transmission embodying the principles of this invention.

Referring now to the drawings, particularly FIG. 1, the reference numeral 10 generally denotes a variable speed dual-path transmission 10 with two infinitely variable speed ranges and having an extended total constant horsepower output range. Dual-path transmission 10 has an input shaft 12 that delivers power from a prime mover (not shown), such as an internal combustion engine, electric motor, or other source of power, to a gear 14 mounted on an input shaft 12. Shaft 12 also drives one or more auxiliary pumps 16 of well known construction which serve to provide pressurized fluid to operate the various fluid actuated clutches, control systems and lubricating functions of transmission 10. Gear 14 meshes with and drives a gear 18 affixed to intermediate or clutch shaft 20. Mounted for rotation on intermediate shaft 20, close to gear 18, is another gear 22, with a further gear 24 also being mounted for rotation on intermediate shaft 20 and spaced from gear 22. Gear 22 can be connected to shaft 20 for conjoint rotation therewith by means of a first clutch 26 while gear 24 can also be connected to shaft 20 for conjoint rotation therewith by means of another clutch 28. Clutches 26 and 28 are mounted in tandem and may be of a multiple plate fluid-actuated type, tooth-type, or friction type, of well known construction. Gear 18 also meshes with and drives a further gear 30 which, for the convenience of illustration, is shown out of its true position.

Gear 30 is affixed to a support shaft 32 which also is drivingly connected with a first portion 34 (also shown out of its true position) of variable speed device 33, which in turn includes a second portion 38 that is drivingly connected with an intermediate or reaction shaft 40. Variable speed means or device 33 may basically be defined as providing a speed proportional to the speed of the prime mover on one, and a variable speed on the other, of shafts 32 and 40, respectively, as required, to permit the operation of transmission 10 as described hereinafter.

A dual-path transmission may, as its name implies, be defined as a transmission that has two separate power paths, with the preferred embodiment of transmission 10 being a hydromechanical transmission, i.e., having a mechanical power path and a hydraulic power path in each of its two speed ranges.

By way of explanation, first portion 34 of variable speed device 33 may include a motor-pump device, preferably a hydraulic unit of the variable displacement type. Second portion 38 of variable speed device 33 may include a pump-motor device preferably a hydraulic unit of the fixed displacement type. If portions 34 and 38 are hydraulic units, they are hydraulically interconnected by lines 35 and 37 within a manifold 36. In lieu of being a hydraulic device, variable speed means or device 33 may, for example, also take the form of a variable speed traction device. While dual-path transmission 10, for ease of understanding, will hereinafter be described in the form of a hydromechanical transmission it should, of course, be understood that it is not limited thereto.

Intermediate shaft 40 also has affixed thereto, or has integral therewith, on the end removed from variable speed second portion 38, a sun or reaction gear 44. Sun gear 44, which is an integral part of a first or low range planetary assembly 42 (also including planet gears 46, carrier 50 and internal ring gear 52, all of which will be described in more detail), meshes with a plurality of first planet gears 46 (only one of which is shown), with planet gears 46 being mounted on shafts 48 of a carrier 50. First planet gears 46 in turn mesh with a first internal ring gear 52, with the outer surface of ring gear 52 being provided with an external gear portion 54 which is in constant mesh with gear 24 on shaft 20. First planet gears 46 also mesh with a plurality of second planet gears 56 (only one of which is shown) that are mounted for rotation on shafts 58 of carrier 50. Second planet gears 56 in turn mesh with second internal ring gear 60. Sun gear 44, planet gears 46, planet gears 56, carrier 50 and ring gear 60 together constitute a second, or high, range planetary assembly 66. Connected to or forming an integral part of second ring gear 60 is an external gear 62 which is in constant mesh with gear 22 on shaft 20. Carrier 50 is connected to or forms an integral part of output shaft 64, with output shaft 64 being axially aligned with shaft 40. See FIG. 3 for a schematic representation showing the interaction between the two planetary assemblies and variable speed device 33. The planetary combination (i.e., planetary assemblies 42 and 66) represent one of the dual transmission paths while variable speed device 33 represents the other of the dual transmission paths.

At this point, it will be seen that input shaft 12 is coupled to first portion 34 of variable speed device 33 by means of a gear train comprising gears 14, 18 and 30. Second portion 38 of variable speed device 33, which is drivingly connected with first portion 34, in turn is coupled for rotation with sun gear 44 on shaft 40. As noted, first and second portions 34 and 38, respectively, preferably are hydraulic units that are hydraulically interconnected by a manifold device 36, with portion 34 serving as a pump while portion 38 serves as a motor, and in the alternative, portion 38 serving as a pump while portion 34 serves as a motor. Portions 34 and 38 regulate the torque being applied to shaft 40 from planetary assemblies 42 and 66 by means of sun gear 44 which serves as a reaction member.

At this time, it should be clear that first internal ring gear 52 is driven by input shaft 12 through the gear train comprising gears 14, 18, 24 (when clutch 28 is engaged) and 54. Second internal ring gear 60 is driven by input shaft 12 through the gear train comprising gears 14, 18, 22 (when clutch 26 is engaged) and 62.

The operation of transmission 10 may be described as follows: zero output, i.e., when output shaft 64 and carrier 50 are stationary, is achieved when clutch 28 (low range) is applied so that input gear 14 rotates first internal ring gear 52 (through the gear train comprising gears 18, 24 and 54) at a predetermined speed, which, of course, is based on the ratios of the gears involved. At the same time, sun gear 44 is rotated (see FIG. 2, point A) in a direction opposite to that of first internal ring gear 52 so that the pitch line velocity of sun gear 44 is substantially equal to the pitch line velocity of first internal ring gear 52 with the result that carrier 50 remains stationary. At this time, first planet gears 46 rotate about their centers on shafts 48, and since carrier 50 is stationary, there is no output. Again, at the same time, since sun gear 44 is being driven in the opposite direction to internal ring gear 52, portion 38 serves as a pump, while portion 34 serves as a motor, and there is regeneration. What is meant by "regeneration" is that variable speed device 33 recirculates power back into planetary assembly 42 and the total horsepower handled within planetary assembly 42 is, therefore, in this instance, that of the prime mover plus that generated by variable speed device 33.

As first internal ring gear 52 continues to rotate with low clutch 28 in engagement, and the pitch line velocity of sun gear 44 is gradually reduced, then sun gear 44 will act as a reaction element and carrier 50 will start to rotate with the speed of its rotation increasing as the speed of rotation of sun gear 44 decreases. It should be understood that the speed of carrier 50 is based on the physical dimensions of the elements of planetary assembly 42 as such. When sun gear 44 becomes stationary (see FIG. 2, point B), it acts as a pure reaction element, and at this time, since the displacement of portion 34 has been reduced to near zero and the regenerative horsepower has disappeared, transmission 10 operates as a purely mechanical system.

However, as soon as sun gear 44 is driven (via portions 34 and 38) in the same direction as first ring gear 52, then the speed of carrier 50 and output shaft 64 increases in relation to the increase in speed of sun gear 44. Maximum output speed in low range operation is achieved when the sun gear 44 is driven at or near maximum speed (see FIG. 2, point C) in the same direction as first ring gear 52, with ring gear 52, sun gear 44, and carrier 50 all rotating in a collective forward direction. At this time, transmission 10 operates as a split-system, i.e., the transmitted horsepower is split between the mechanical and variable speed systems, i.e., planetary assembly 42 and variable speed device 33, with portion 34 serving as a pump and portion 38 serving as a motor.

At this time, it should be noted that during low range operation, since first pinions or planet gears 46 mesh with second pinions or planet gears 56, second internal ring gear 60 will freely rotate, thereby also rotating gears 62 and 22. At maximum speed in low range, clutch 28 (low range) and the drum of clutch 26 (high range) rotate at the same speed as gear 22. Therefore, high range clutch 26 can be applied so as to connect gear 22 for conjoint rotation with shaft 20. It should be understood that, in order to accomplish a continually variable output speed while going through two ranges, it is necessary for the speeds of the members to be engaged to be very closely synchronized before engagement.

Upon the engagement of high range clutch 26, low range clutch 28 is disengaged and input shaft 12 now drives second ring gear 60 (and as such planetary assembly 66) through the gear train comprising gears 14, 18, 22 and 62. Thw lowest output speed in high range operation is when sun gear 44 is rotating (see FIG. 2, point C) at its maximum speed in the same direction as second ring gear 60. At this time, transmission 10 resumes operating as a regenerative system, with sun gear 44 again transmitting power back to shaft 20 via portions 38 and 34, the former acting as a pump and the latter as a motor. The rotational speed of output shaft 64 may be progressively increased by progressively decreasing the speed of sun gear 44 until sun gear 44 becomes stationary (see FIG. 2, point D). When sun gear 44 becomes stationary, it again acts as a pure reaction element since the displacement of portion 34 is reduced to near zero and transmission 10 again operates as a purely mechanical system.

Thereupon, the progressively increased driving of sun gear 44, in a direction opposite to that of second ring gear 60, produces a progressively higher output speed of output shaft 64, with the maximum output speed being achieved when sun gear 44 is driven at its maximum speed (see FIG. 2, point E) in a direction opposite to that of second ring gear 60. Since sun gear 44 is being driven in a direction opposite to that of ring gear 60, portion 34 serves as a pump, portion 38 serves as a motor and transmission 10 again operates as a split system.

Transmission 10 may be described as an input-coupled system, and the torque on the elements of planetary assemblies 42 and 66 is always in direct proportion to the torque on output shaft 64. It should also be noted that the magnitude of torque on any element is based on its ratio or physical dimensions with reference to the other elements being loaded in each range. Furthermore, since transmission 10 is designed to transmit constant horsepower (see FIG. 2, points H–J) when the output shaft speed is low, the torque is correspondingly high and vice versa, in each range.

It should now be clear that dual-path transmission 10 preferably is a hydromechanical transmission which provides the efficiency and simplicity of a mechanical power path preferably coupled with hydraulic variable speed control. Transmission 10 utilizes split path and regenerative planetary systems to combine the optimum advantages of both hydraulic and mechanical elements. The combination of these systems offers a constant horsepower output throughout a wide range output speed without the need for an external output range transmission. Transmission 10 accepts full output torque requirements at low speeds and offers total capability above and beyond that offered by existing state-of-the-art equipment.

The principle of operation of infinitely variable transmission 10 may be explained as follows: taking a simple planetary assembly (such as planetary assembly 42, which includes sun gear 44, multiple planet gears 46, carrier 50 and internal ring gear 52) and turning the ring gear in one direction and the sun gear in the opposite direction will allow the planet gears to rotate freely around the output planet carrier pins. This condition is zero output speed. When the speeds are adjusted exactly (i.e., that the pitch line velocity of the sun gear is substantially equal to the pitch line velocity of the ring gear), the centers of the spinning planet gears will not move sideways to turn the planet carrier and the planet pins. If the sun gear is stopped while the ring gear still rotates, the planet pins and carrier will be forced to rotate in the direction of the ring gear. When the sun and ring gears are rotated at the same speed, then all members will rotate together. This condition is called power-splitting, since part of the torque is transmitted to the output carrier pin by the ring gear and the rest is being supplied by the sun gear. The proportions of power being supplied by each are proportional to the torques of the respective gears. If the speeds of the sun and ring gear are not the same, then the power transmitted is a function of speed and torque. For example, if the sun gear is not moving and is held against rotation, the planetary system, at this time, can be considered a simple mechanical reduction (ring to carrier); therefore, all power is being transmitted by the ring gear. Any movement of the sun gear (which changes the output from this base ratio) causes power to flow from, or to, whichever element the sun gear is driven by, or driving. These last statements of "power flowing to an element" and "sun gear driving an element", are based on the principle of regeneration. In the example, wherein the pitch line velocity of the sun gear is substantially equal to the pitch line velocity of the ring gear (allowing the planet gears to freely rotate around the output planet carrier pins), the power path is regenerating when the output is fully loaded, since the speed of the sun gear is opposite to the input gear rotation, yet the torque conditions have never changed directions, but only magnitude. This means that the power flow is not only leaving the planetary unit via the carrier, but is also leaving through the sun gear and subsequently added to the input power and flowing back into the ring gear. The limit of this torque and speed (power flow) is controlled by the design features of the variable speed device that is interposed between the sun gear and the input shaft as previously described.

At this time, it should be noted that the physical dimensions of all planetary elements (namely, sun gear 44, planet gears 46 and 56, carrier 50, as well as ring gears 52 and 60) are of extreme importance in that they determine the maximum torque that can be regenerated within variable speed device 33. In addition, the size of all planetary elements must also be optimized so that, for the total desired constant output horsepower range, the level of maximum torque that is generated in each of the two (low and high) ranges is substantially the same. See points F and G in FIG. 2 which show that the transmission is balanced both in terms of pressure and torque on variable speed device 33. Furthermore, points A, C and E in FIG. 2 show that the maximum speeds of variable speed device 33 are identical in both transmission ranges.

Transmission 10 complies with formula or equation I noted hereinbelow, with the use of this formula permitting solution for the peak value of the smallest horsepower range that will be regenerated within the transmission, which in turn also equals the maximum horsepower that the variable speed device must be capable of transmitting. Formula I permits the solution for the smallest possible variable speed device horsepower for a variable speed dual-path transmission having two infinitely variable speed ranges and an extended total constant horsepower output range (e.g., two range hydromechanical transmission) when the following values are known.

a. input (prime mover) horsepower; and
b. total constant output horsepower range.

$$\text{Max. } HP_{VSD} = HP_E \times [1/4 \ ( \ \sqrt{(4 \times \text{Max. } HP_{TCOR} + 1)} - 1)] \quad (I)$$

where
$HP_{VSD}$ = Variable Speed Device Horsepower
$HP_E$ = Input (prime mover or engine) Horsepower
$HP_{TCOR}$ = Total Constant Horsepower Output Range It must be stressed that previously noted formula I relates the size of both the prime mover and the variable speed device to the maximum total constant horsepower output range that can be obtained with any two-range, dual-path transmission, as long as both ranges are of the regenerative type. No other known formula provides such a large constant horsepower output range.

For example, if the value of $HP_E$ is selected at 100 and the $HP_{TCOR}$ ranges are respectively selected at 2:1; 6:1; 12:1 20:1 and 42:1, then the Max. $HP_{VSD}$ values will respectively be 50; 100; 150; 200 and 300.

In comparison to formula (I), the previously-noted prior art transmission (having a hydrostatic low range and a hydromechanical high range) complies with the following formula:

$$\text{Max. } HP_{VSD} = HP_E \times [1/4 \ ( \ \sqrt{(8 \times \text{Max. } HP_{TCOR} + 1)} - 1)] \quad \text{(prior art—1)}$$

In this prior art transmission, if, for example, the value of $HP_E$ is selected at 100 and the $HP_{TCOR}$ range is selected at 6:1, then the Max. $HP_{VSD}$ value will be 150, as compared to 100 when using the same values in formula I. Thus, in comparison with the prior art, the use of formula I permits the use of a significantly smaller variable speed device since, as shown by the example, less horsepower must be transmitted.

Limitations on the extent of the total constant horsepower output range, in low range, include the maximum torque or pressure that the variable speed device is capable of withstanding, whereas, in the high range, it is the maximum speed capability at which the variable speed device can be driven. To obtain the desired maximum total constant horsepower output range, one must utilize the maximum torque that the transmission elements are capable of transmitting at one end of the range and the maximum speed that the transmission elements are capable of achieving at the other end of the range. At the shift point between the two ranges, ideally the pressure of the variable speed device increases to its uppermost limit. The problem to be solved thus includes not only the selection of the type of planetary system that will boost the hydraulic pressure of the variable speed device to its maximum value at the transmission shift point, but also the selection or optimization of the correct physical dimensions for the planetary system that can accomplish this goal.

The solution of this problem involves three unknowns, namely:

1. the physical dimensions of the low range planetary elements.
2. the physical dimensions of the high range planetary elements.
3. the desired total constant horsepower output range.

In order to be able to use a variable speed device of minimum size and to accomplish this goal in a range shift transmission, the hydraulic pressure within the variable speed device must return to its maximum value when shifting from the low to the high range of the transmission. Thus, one of the goals of this invention is the optimization of i.e., to make as functional as possible the particular planetary arrangement set forth in FIGS. 1 and 3 in order to provide a smallest possible variable speed device for a transmission having the particular desired or required total constant horsepower output range.

A not so obvious fact is that the maximum speeds of the variable speed device, as well as the maximum rated output horsepower, are identical in both transmission ranges and that the differential systems, i.e., the planetary assemblies, required to meet these objectives, must both be capable of being built and capable of withstanding the applied loads.

The total constant horsepower output range ($HP_{TCOR}$) of the two range dual-path transmission of this invention can be calculated with the use of the following formula (II) when the values for $HP_E$ and $HP_{VSD}$ are known:

$$HP_{TCOR} = \left[2 \ \frac{HP_{VSD}}{HP_E}\right] \left[\left(2 \ \frac{HP_{VSD}}{HP_E}\right) + 1\right] \quad (II)$$

For example, if the value of $HP_E$ is selected at 100 and the $HP_{VSD}$ values are respectively selected at 50; 100; 150; 200 and 300, then $HP_{TCOR}$ ranges will respectively be 2:1; 6:1 12:1; 20:1 and 42:1.

In comparison to formula (II), the previously-noted prior art transmission (having a hydrostatic low range and a hydromechanical high range) complies with the following formula:

$$HP_{TCOR} = \left[\frac{HP_{VSD}}{HP_E}\right] \left[\left(2 \frac{HP_{VSD}}{HP_E}\right) + 1\right] \quad \text{(prior art - 2)}$$

In this prior art transmission, if, for example, the value of $HP_E$ is selected at 100 and the $HP_{VSD}$ value is selected at 200, then the $HP_{TCOR}$ range will be 10:1, as compared to 20:1 when using the same values in formula II. Thus, in comparison with the prior art, the use of formula II permits, as shown by the example, the construction of a transmission having a significantly greater total constant horsepower output range.

while many planetary and differential systems (or combinations) are theoretically capable of meeting the requirements of formula II, no system is known or has been determined as of this date that exceeds the stated relationships of this formula. In addition, many systems that appear to fit the requirements, upon further investigation, are impractical since they are unable to support the loads and speeds that have to be transmitted.

In order to develop and prove a truly workable system, the following known and/or derived list of values and factors must be considered for various sun/ring ratios:

1. the input torque to transmission.
2. the maximum speed capability of the variable speed device.
3. the physical dimensions of the sun/ring ratios of the particular planetary systems to be evaluated.
4. the fact that there must be a synchronous shift between the two transmission ranges.
5. the minimum transmission output speed must be zero.
6. the maximum speed in low range (computed).
7. the maximum speed in high range (computed).
8. the maximum torque output in high range (computed).
9. the maximum torque output in low range (computed with the same maximum torque on the variable speed device as in high range).
10. the minimum to maximum total output torque spread and corresponding horsepower spread ($HP_{TCOR}$) in both high and low ranges (computed).

Once the value of item 10 has been determined, a three dimensional graph, such as that shown in FIG. 4, can be developed, using the various sun/ring gear ratios in order to graphically show the physical sizes of the particular planetary or differential gear sets that can satisfy each level of total capability. While the method of determining a balanced design is not an easy one to visualize, the three dimensional graph is of help in explaining it. FIG. 4 shows the relationship of the following four factors:

a. the sun to ring gear size ratio - low range.
b. the sun to ring gear size ratio - high range.
c. the total constant output horsepower range ($HP_{TCOR}$).
d. the particular curved surface K where the maximum pressures of the variable speed device are the same in both low and high range for various sun/ring ratios. (Surface K is bounded by lines L, M, N and O.)

For every low and high range sun/ring gear ratio there is a value of minimum to maximum output total torque spread ($HP_{TCOR}$). A series of these calculated values or points, when plotted, as in FIG. 4, forms curved surface K. More specifically, surface K is developed by developing a series of curved lines, such as O, each of which in turn is first developed by computing and plotting a series of points corresponding to various minimum to maximum total output torque spreads, in both low and high range for each specific sun/ring gear ratio. A plurality of these developed lines then defines curved surface K.

It should, of course, be kept in mind that FIG. 4, or more specifically the particular shape and curvature of surface K of FIG. 4, is unique to the planetary combination shown in FIGS. 1 and 3, i.e., one having a combination planetary system wherein a sun gear is common to a simple (single set of planet gears) and a dual (dual and intermeshing sets of planet gears) planetary system. Curved surfaces K for differential or planetary systems other than those shown in FIGS. 1 and 3 can, of course, be derived through the use of the 10 point list of values and factors as previously set forth.

While surface K contains all of the infinite points from which a balanced system may be selected (in both low and high ranges), since sun/ring gear ratios below 0.27 and above 0.60 require sun and planet gears, respectively, that could be physically marginal (i.e., too small) for effectively transmitting the desired torque, then a preferred area, bounded by these values, can be defined.

In FIG. 4, surface Q (bounded by lines R, S, T, U and a portion of N) which forms a part of surface K, depicts such a preferred area of acceptable performance and contains all of the infinite points from which a balanced system may be selected in conformance with the previously developed criteria.

An analysis of FIG. 4 will show that the transmission of this invention has the capability of handling total constant output horsepower ranges, within preferred surface Q, from about 2:1, up to and beyond 40:1.

For example, if a balanced design 10:1 total constant horsepower output range ($HP_{TCOR}$) is desired, both the low and high range sun/ring gear ratios can be found in FIG. 4 by projecting any point on line X—Y, which is the portion of the 10 $HP_{TCOR}$ line within surface Q, down to the plane defined by the low and high range sun/ring gear ratio lines (lines L and P, respectively). For instance, projecting point X down to plane LP results in sun/ring size ratios of about 0.27 for low and about 0.35 for high range, respectively.

In contrast to prior art devices, the transmission of this invention shows (as best seen in FIG. 2) the following major improvements:

1. It is a dual-path system in both low and high ranges.
2. It is regenerative at zero output, i.e., in low range the transmission has zero output capability while the input and the reaction element are rotating.
3. The variable speed device is utilized to its maximum design capability in both ranges; even at zero output the variable speed device is operating at approximately its maximum speed.
4. The maximum torque capability is substantially the same in each range.

5. The two ranges are tied together, with the high range being an extension of the low range.

6. The speeds of the reaction member (sun gear 44) always go to a maximum at both the beginning and end of each range.

7. The physical sizes of the planetary elements are so selected that the maximum torque on the reaction gear (sun gear 44) is the same at the lowest speed in each of the two ranges.

8. By satisfying previously stated formula I, the transmission utilizes the smallest possible variable speed device that is capable of transmitting the maximum horsepower regenerated within a two range dual-path transmission.

9. By satisfying prviously stated formula II, the transmission achieves the largest possible total constant output horsepower range of any known two-range, dual-path, transmission.

While surface K of FIG. 4 is specific to the planetary combination shown in FIGS. 1 and 3, formulas I and II are applicable to all planetary combinations that are useable in a variable speed dual-path transmission of the type having two infinitely variable speed ranges in conformance with the criteria previously described herein.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. For example, forward and reverse clutches could readily be added to the input or output so as to permit forward and reverse operation. As a result, the embodiment described herein is subject to various modifications, changes and the like, with the scope of this invention being determined solely by reference to the claims appended hereto.

What is claimed is:

1. A variable speed dual-path transmission with two infinitely variable speed ranges and having an extended total constant horsepower output range ($HP_{TCOR}$), said transmission comprising:

a. input means including means for providing input horsepower ($HP_E$);

b. final output means;

c. a pair of gear trains for alternately connecting said input means with said output means, said gear trains comprising two transmission ranges of different ratios and comprising one of said dual paths in each of said ranges;

d. each of said pair of gear trains including a planetary gear assembly, with a set of planet gears of a first planetary gear assembly of one gear train being intermeshed with a set of planet gears of a second planetary gear assembly of another gear train and a common carrier for both sets of planet gears;

e. said input means being drivingly connected to said sets of planet gears of said first and second planetary gear assemblies through first and second ring gears, respectively;

f. said common carrier comprising the sole output member of said pair of gear trains and being connected with said output means;

g. a sun gear meshed with the set of planet gears of said first planetary gear assembly and serving as the reaction member;

h. a reaction shaft connected to and in driving relation with said sun gear;

i. means for connecting said reaction shaft to said input means through a variable speed device (VSD), said variable speed device comprising another of said dual paths in each of said ranges, and providing a speed proportional to the speed of the input means on one and a variable speed on the other of said input means and reaction shaft, with the maximum horsepower that said variable speed device must be capable of transmitting (Max. $HP_{VSD}$) substantially fitting the equation:

$$\text{Max. } HP_{VSD} = HP_E \times [1/4 \ ( \ \sqrt{(4 \times \text{Max. } HP_{TCOR} + 1)} - 1)]$$

j. the end of said range of one gear train overlapping the beginning of said range of the said other gear train; and k. means for alternately connecting and disconnecting said gear trains to said input means at said overlapping range ends, whereby power is transmitted alternately from said gear trains to drive said output means through its two speed ranges with said transmission being regenerative in one of said speed ranges at substantially zero output speed, so that, when said sun gear is rotated, in a direction opposite to that of said first ring gear, at a pitch line velocity that is substantially equal to the pitch line velocity of said first ring gear, said common carrier and said output means remain substantially stationary.

2. The transmission of claim 1 wherein the physical size of the planetary elements of each of said planetary assemblies is optimized so that, for the desired total constant horsepower output range, the level of maximum pressure and torque that is applied to said variable speed device, in each of the two speed ranges, is substantially the same.

3. The transmission of claim 2 wherein the sun/ring gear ratios of each of said planetary assemblies preferably lie in the range from about 0.27 to about 0.60.

4. The transmission of claim 1 wherein the physical sizes of the planetary elements of each of said planetary assemblies is optimized so that, for the desired total constant horsepower output range, the variable speed of the variable speed device is substantially the same at zero output speed, at overlapping range ends and at the maximum output speed of said transmission.

5. The transmission of claim 1 wherein said total constant horsepower output ranges preferably extend from about 2:1 up to and beyond 40:1.

6. The transmission of claim 1 wherein said total constant horsepower output range ($HP_{TCOR}$) substantially fits the equation:

$$HP_{TCOR} = \left[ 2 \ \frac{HP_{VSD}}{HP_E} \right] \left[ \left( 2 \ \frac{HP_{VSD}}{HP_E} \right) + 1 \right]$$

7. A variable speed dual range hydromechanical transmission having an extended total constant horsepower output range, said transmission having an extended total constant horsepower output range, said transmission comprising;

15 a. an input shaft including means for providing input horsepower ($HP_E$);
b. an output shaft;
c. a variable speed device for transmitting horsepower ($HP_{VSD}$) including a pair of separate hydraulic units and further including means providing hydraulic communication between said units;
d. one of said hydraulic units being drivingly connected with said input shaft;
e. output planetary gearing including a plurality of members;
f. a first of said members of said output planetary gearing being drivingly connected with another of said hydraulic units, with one of said pair of hydraulic units providing a variable speed on one of said input shaft and said first member of said output planetary gearing;
g. said output shaft being solely connected with a second of said members of the output planetary gearing;
h. an auxiliary shaft;
i. means drivingly connecting said auxiliary shaft with said input shaft; and
j. selectively engageable and disengageable means for alternately drivingly connecting said auxiliary shaft to one of a third and a fourth member of said output planetary gearing, said third and fourth members being drivingly connected with said second member of said output planetary gearing for providing said dual transmission ranges, with said total constant horsepower output range, ($HP_{TCOR}$) substantially complying with the formula:

$$HP_{TCOR} = \left[ 2 \frac{HP_{VSD}}{HP_E} \right] \left[ \left( 2 \frac{HP_{VSD}}{HP_E} \right) + 1 \right]$$

with said transmission being regenerative in one of said dual ranges at substantially zero output speed, so that, when said output planetary gearing first member is rotated, in a direction opposite to that of said output planetary third member, at a pitch line velocity that is substantially equal to that of said output planetary gearing third member, said output planetary gearing second member remains substantially stationary.

8. The transmission of claim 7 wherein one of said hydraulic units has a variable stroke and the other of said hydraulic unit has a fixed stroke.

9. The transmission of claim 7 having auxiliary pump means driven by said input shaft.

10. The transmission of claim 7 wherein said first of said members of said output planetary gearing is a sun gear.

11. The transmission of claim 10 wherein the speeds of said sun gear always go to a maximum at both the beginning and end of each of said transmission dual ranges.

12. The transmission of claim 10 wherein the physical sizes of the members of said output planetary gearing are so selected that the maximum torque on said sun gear is the same at the lowest output speed in each of said transmission dual ranges.

13. The transmission of claim 7 wherein said second of said members of said output planetary gearing is a carrier.

14. The transmission of claim 7 wherein said third and fourth members of said output planetary gearing are first and second ring gears, respectively.

16

15. The transmission of claim 7 wherein the maximum horsepower that said variable speed device must be capable of transmitting (Max. $HP_{VSD}$) substantially fits the equation:

$$\text{Max. } HP_{VSD} = HP_E \times [\,1/4\,(\,\sqrt{(4 \times \text{Max. } HP_{TCOR} + 1)} - 1\,)\,]$$

16. The transmission of claim 7 wherein the physical sizes of the members of said output planetary gearing are so selected that for the desired total constant horsepower output range, the level of maximum pressure and torque that is applied to said variable speed device, in each of the transmission dual ranges, is substantially the same.

17. The transmission of claim 7 wherein the physical sizes of the members of said output planetary gearing are so selected that for the desired total constant horsepower output range, the variable speed of the variable speed device is substantially the same at zero output speed and at maximum output speed.

18. The transmission of claim 7 wherein said total constant horsepower output ranges preferably extend from about 2:1 up to about 40:1.

19. A dual-path infinitely variable speed dual range power transmission having an extended total constant horsepower output range ($HP_{TCOR}$), said transmission comprising:

a. driving means including means for providing input horsepower ($HP_E$);
b. combination planetary gear train means drivably connected to said driving means and including intermeshing first and second sets of planet gears with a common carrier serving as the sole output of said planetary gear train means, said first and second sets of planet gears being intermeshed with first and second ring gears, respectively; and a reaction gear in mesh with one of said first and second sets of planet gears, with at least a portion of said gear train means serving as one of said dual-paths in each of said ranges;
c. first and second input gears driven by said driving means and drivingly interconnected with said first and second ring gears, respectively;
d. final output means connected with said common carrier;
e. means for alternately connecting said first and second input gears to said first and second ring gears, respectively; and
f. means for connecting said reaction gear to said driving means through a variable speed device (VSD), said variable speed device serving as another of said dual-paths in each of said dual ranges and including a first and second portion, one serving as a motor while the other serves as a pump, and vice versa, for regulating the horsepower applied to said planet gears, with the maximum horsepower being transmitted by said variable speed device (Max. $HP_{VSD}$) being substantially equal to:

$$HP_E\,[\,1/4\,(\,\sqrt{(4 \times \text{Max. } HP_{TCOR} + 1)} - 1\,]$$

with said transmission being regenerative in one of said dual ranges at substantially zero output speed, so that, when said reaction gear is rotated, in a direction opposite to that of said first ring gear, at a pitch line velocity that is equal to the first ring gear pitch line velocity, said final output means remains substantially stationary.

20. The transmission of claim 19 wherein said pump and motor are hydraulic units of the piston type.

21. The power transmission of claim 20 wherein at a shift from one of said input gears to the other of said input gears, the hydraulic unit, which before the shift was serving as a motor, immediately thereafter serves as a pump, and vice versa.

22. The transmission of claim 19 wherein said total constant horsepower output range preferably extends from about 2:1 up to about 40:1.

23. The transmission of claim 19 wherein the end of one of said ranges overlaps the beginning of the other of said ranges and wherein the physical sizes of said combination planetary gear train means are so selected that, for the desired total constant horsepower output range, the variable speed of the variable speed device is substantially the same at the zero output speed, the overlapping range ends and the maximum output speed of said transmission.

24. In an extended total constant horsepower output range ($HP_{TCOR}$) variable speed dual range transmission of the type having input means for providing input horsepower ($HP_E$), output means, combination planetary gear train means, including a sun gear, and a pair of ring gears wherein one of the ring gears meshes with a plurality of single planet gears which in turn mesh with the sun gear and wherein the other ring gear meshes with a plurality of double planet gears which also mesh with the sun gear, and wherein the sun gear is connected to one of a pair of operatively connected hydraulic units that comprise a variable speed device, with the other of said pair of hydraulic units being driven by the input means, wherein there is a common carrier for the pluralities of single and double planet gears, with the carrier being connected to the output means and wherein first clutch means are provided for selectively connecting and disconnecting one of the ring gears to the input means for providing one of said dual transmission ranges, the improvement comprising:

a. the addition of second clutch means for selectively connecting and disconnecting the other of the ring gears to the input means for providing the other of said dual transmission ranges;

b. the addition of said second clutch means permitting said transmission to have a mechanical and a hydraulic power path in each of said dual transmission ranges;

c. at least a portion of said gear train means serving as said mechanical power path in each of said ranges;

d. said variable speed device serving as said hydraulic power path in each of said ranges; and e. said transmission being regenerative in one of said dual ranges at substantially zero output speed of said transmission so that, when said sun gear is rotated, in a direction opposite to that of said one of said ring gears, at a pitch line velocity that is substantially equal to the pitch line velocity of said one of said ring gears, said common carrier and said output means remain substantially stationary.

25. The improved transmission of claim 24 wherein the physical sizes of said planetary gear train means are optimized so that for the desired total constant horsepower output range ($HP_{TCOR}$), the level of maximum pressure and torque that is applied to said variable speed device, in each of said dual transmission ranges, is substantially the same.

26. The improved transmission of claim 24 wherein the physical sizes of said planetary gear train means are optimized so that for the desired total constant horsepower output range ($HP_{TCOR}$), the variable speed of said variable speed device is substantially the same at zero output speed and at maximum output speed of said transmission.

27. The improved transmission of claim 24 wherein the maximum horsepower that said variable speed device must be capable of transmitting (Max. $HP_{VSD}$) substantially fits the equation:

$$\text{Max. } HP_{VSD} = HP_E \times [1/4 \ ( \sqrt{(4 \times \text{Max. } HP_{TCOR} + 1)} - 1)]$$

28. The improved transmission of claim 27 wherein said total constant horsepower output range ($HP_{TCOR}$) substantially fits the equation:

$$HP_{TCOR} = \left[ 2 \ \frac{HP_{VSD}}{HP_E} \right] \left[ \left( 2 \ \frac{HP_{VSD}}{HP_E} \right) + 1 \right]$$

29. The improved transmission of claim 24 wherein the sun/ring gear ratios of said planetary gear train means preferably lie in the range from about 0.27 to about 0.60.

* * * * *

UNITED STATES PATENT OFFICE
CERTIFICATE OF CORRECTION

PATENT NO. : 3,918,325
DATED : November 11, 1975
INVENTOR(S) : Barry L. Frost

It is certified that error appears in the above-identified patent and that said Letters Patent are hereby corrected as shown below:

Column 1, last line, after "No." insert --Re.--.
Column 2, line 31, after "No." insert --Re.--.
Column 7, line 47, delete "Thw" and insert --The--.
Column 8, line 61, after "output" insert --speed--.
Column 11, line 22, delete "while" and insert --While--.
Column 12, line 36, after "preferred" insert --or optimized--.
Column 12, line 38, after "be" insert --optimally--.
Column 14, claim 7, lines 3, 4, 5, delete "having an extended total constant horsepower output range, said transmission".
Column 15, claim 7, line 42, after "planetary" insert --gearing--.

Signed and Sealed this sixth Day of April 1976

[SEAL]

Attest:

RUTH C. MASON
Attesting Officer

C. MARSHALL DANN
Commissioner of Patents and Trademarks